L. P. BEAULIEU & A. O. BONIN.
UTENSIL FOR MOLDING MEAT CAKES.
APPLICATION FILED SEPT. 19, 1910.

986,127.

Patented Mar. 7, 1911.

WITNESSES:
H. L. Sprague
J. D. Long

INVENTORS,
Louis P. Beaulieu and
Alfred O. Bonin,
BY
ATTORNEY.

UNITED STATES PATENT OFFICE.

LOUIS P. BEAULIEU AND ALFRED O. BONIN, OF HOLYOKE, MASSACHUSETTS.

UTENSIL FOR MOLDING MEAT-CAKES.

986,127. Specification of Letters Patent. Patented Mar. 7, 1911.

Application filed September 19, 1910. Serial No. 582,773.

*To all whom it may concern:*

Be it known that we, LOUIS P. BEAULIEU and ALFRED O. BONIN, citizens of the United States of America, and residents of Holyoke, in the county of Hampden and State of Massachusetts, have invented certain new and useful Improvements in Utensils for Molding Meat-Cakes, of which the following is a full, clear, and exact description.

The object of this invention is to provide a mold in which cakes of hamburg steak, mince meat or fish, or croquettes may be formed, and from which they may be easily expelled.

The device includes an upwardly open receptacle of circular or other appropriate form having a bladed rotative plate in the bottom thereof, the rotative movement of which is imparted by a depending stem having at its lower end a handle knob; the device is provided with a set of legs so that, notwithstanding the presence of the handle beneath the utensil, it may be supported as a stand on a table while being filled with the food material to be molded; the device also includes a horizontally extending handle by which it may be held and overturned when the molded contents are to be discharged from the receptacle or mold.

The utensil is described hereinafter in conjunction with the accompanying drawings and is set forth in the claim.

Figure 1:
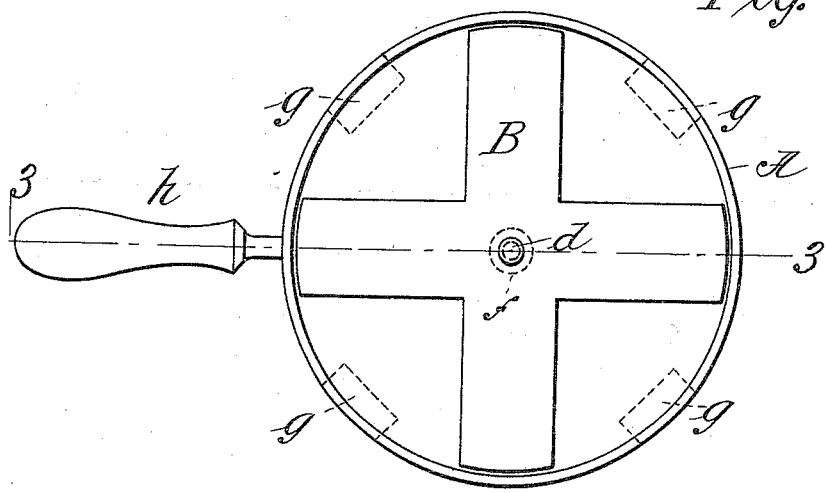
Figure 2:
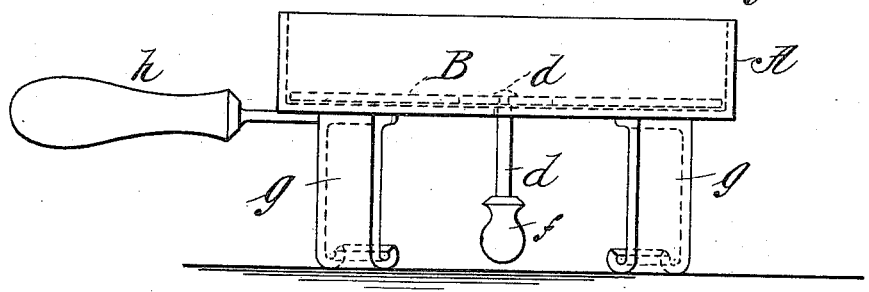
Figure 3:
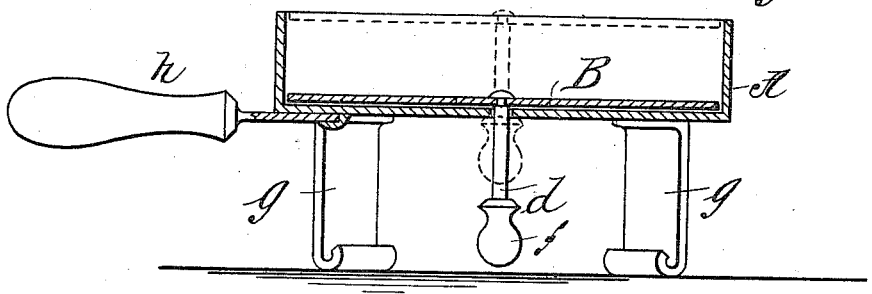

In the drawings:—Figure 1 is a plan view; Fig. 2 is a side elevation, and Fig. 3 is a vertical section on line 3—3, Fig. 1.

A represents the upwardly open receptacle here shown as in the form of a comparatively shallow cup; and it has at the bottom thereof a bladed plate B connected with which is a stem *d* extending downwardly through a perforation in the bottom of the mold and provided with an operating handle or knob *f* at its lower end. The mold has supporting legs *g g* in the rigidly connected outwardly extending handle *h*. The bladed plate normally has its position closely against the bottom wall or base of the mold, and the legs having a somewhat greater height than the downward protrusion of the knob provided stem assure while the utensil is being filled that the stem and bladed plate with which it is connected will not be disturbed.

The mold placed on the table will be filled with the food material which will be more or less compressed therein and leveled at the top. Then the handle *h* will be grasped and the knob will be rotated so that the bottom of the molded cake will be disconnected or separated by the thin bladed plate from any adhesion to the bottom of the mold. Then the knob while the utensil is by the handle held in an inverted position, will be pushed so that the bladed plate will expel the cake from the mold.

The knob *f* acts as a limiting means for preventing the stem from becoming disengaged with the perforated bottom of the mold.

We claim:—

In a utensil of the character described, an upwardly open mold receptacle having a plurality of supporting legs having a transversely extending rigidly connected handle and having a perforation centrally through its bottom, a bladed plate normally resting on the bottom of the receptacle and provided with a depending stem having a handle knob, the downward extension of which handle provided stem is less than the height of the said supporting legs.

Signed by us at Springfield, Mass., in presence of two subscribing witnesses.

LOUIS P. BEAULIEU.
ALFRED O. BONIN.

Witnesses:
WM. S. BELLOWS,
G. R. DRISCOLL.

---

Copies of this patent may be obtained for five cents each, by addressing the "Commissioner of Patents, Washington, D. C."